United States Patent [19]

Iijima et al.

[11] Patent Number: 5,742,358
[45] Date of Patent: Apr. 21, 1998

[54] PROJECTION TYPE DISPLAYING APPARATUS HAVING SCREEN

[75] Inventors: Jun Iijima, Fussa; Koichi Jinda, Mitaka; Masahiro Ogawa, Ome, all of Japan

[73] Assignee: Casio Computer Co., Ltd., Tokyo, Japan

[21] Appl. No.: 433,550

[22] Filed: May 3, 1995

[30] Foreign Application Priority Data

May 12, 1994  [JP]  Japan .................................. 6-124394
Aug. 8, 1994  [JP]  Japan .................................. 6-208171

[51] Int. Cl.⁶ .............................. H04N 5/74; H04N 5/64
[52] U.S. Cl. ..................... 348/789; 348/785; 348/786; 348/787; 348/836; 353/74; 353/119
[58] Field of Search ..................... 348/785, 786, 348/787, 788, 789, 794, 836, 839, 840, 842, 843; 353/77, 119, 78, 74; H04N 5/74, 5/04

[56] References Cited

U.S. PATENT DOCUMENTS 4,181,918  1/1980  Warman et al. ....................... 348/787
5,285,287  2/1994  Shikama ................................ 348/766
5,459,532  10/1995  Baba ..................................... 348/745

FOREIGN PATENT DOCUMENTS 0001673  1/1991  Japan .............................. H04N 5/74
4266276  9/1992  Japan .............................. H04N 5/74
6113238  4/1994  Japan .............................. H04N 5/74

*Primary Examiner*—Michael H. Lee
*Attorney, Agent, or Firm*—Frishauf, Holtz, Goodman, Langer & Chick

[57] ABSTRACT

A projection type displaying apparatus with a movable built-in screen has an image display, an image projector and a position detector for detecting a position where the built-in screen is installed. When the position detector determines that the built-in screen is in an image projection pass, the focus of the image projector is adjusted on the built-in screen and the image projector projects the image onto the built-in screen. When the position detector determines that the built-in screen is out of the image projection pass, the focus of the image projector is adjusted on an external screen and the image projector automatically projects the image onto the external screen.

7 Claims, 18 Drawing Sheets

FIG.7a
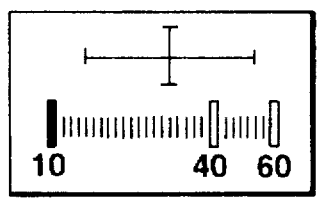
← FOCUS PATTERN
← INDICATOR
FIG.7b
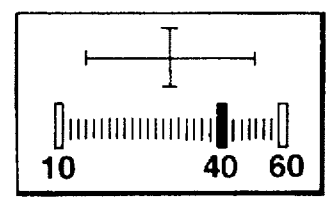
→ FOCUS PATTERN
→ INDICATOR
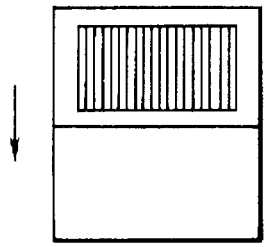
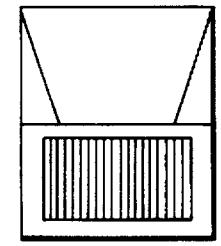
FIG.7c
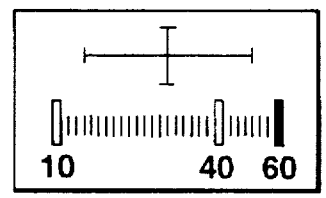
FIG.7d
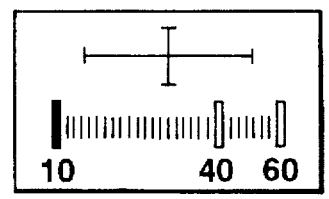
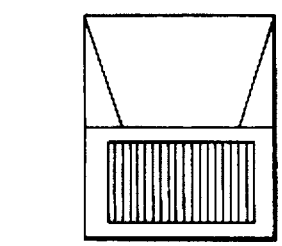
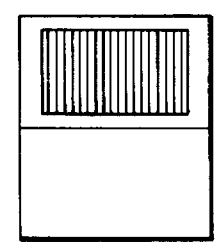

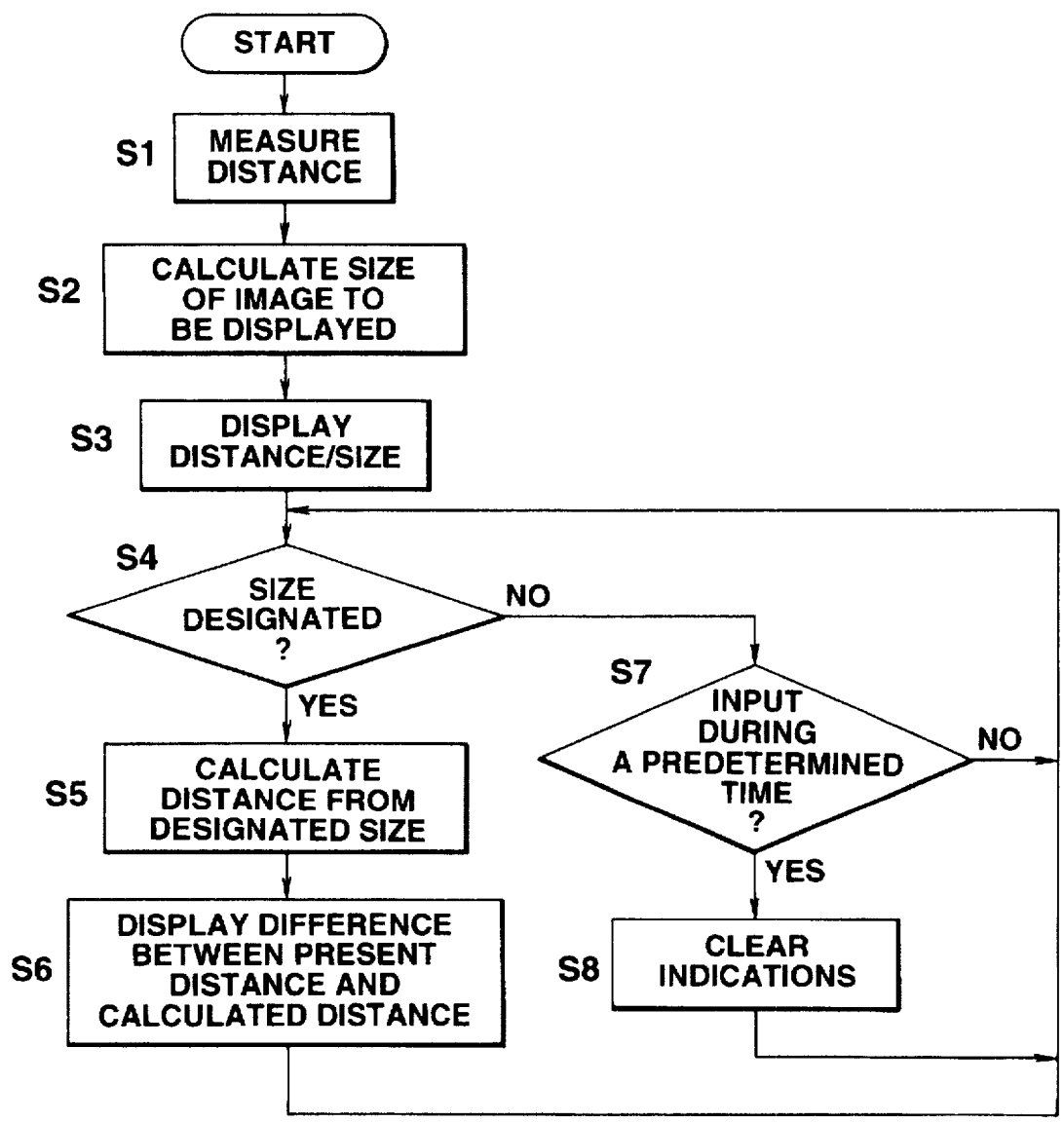

FIG.10

| DISTANCE | IMAGE SIZES |
|---|---|
| NOT LONGER THAN 430mm | S |
| 430mm | 40INCHES |
| 450mm | 42INCHES |
| ⋮ | ⋮ |
| 730mm | 60INCHES |
| NOT SHORTER THAN 730mm | L |

FIG.17a    FIG.17b
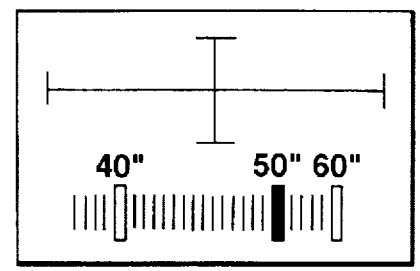
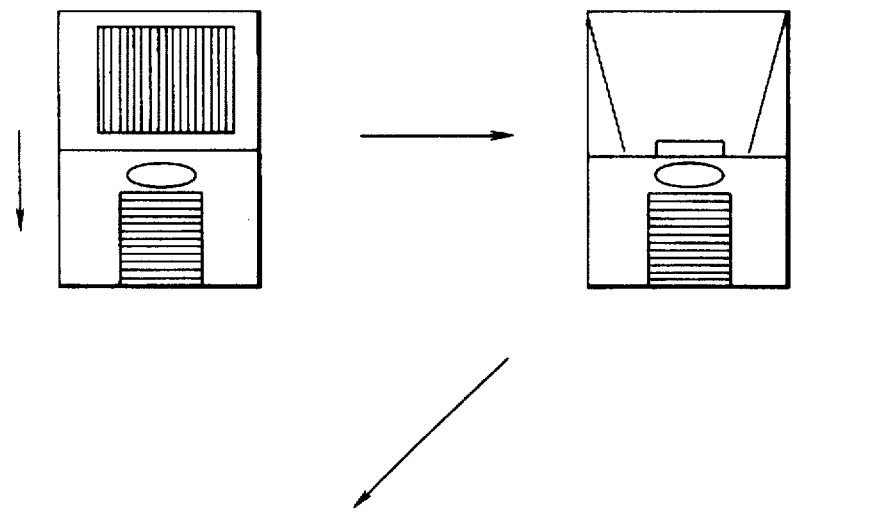
FIG.17c    FIG.17d
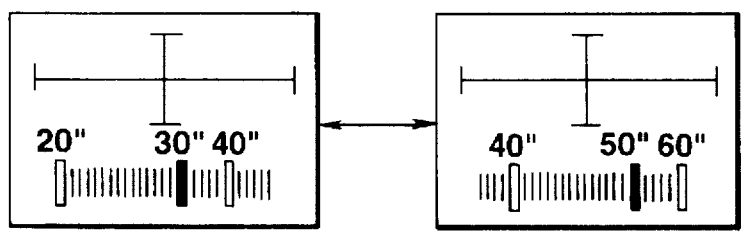
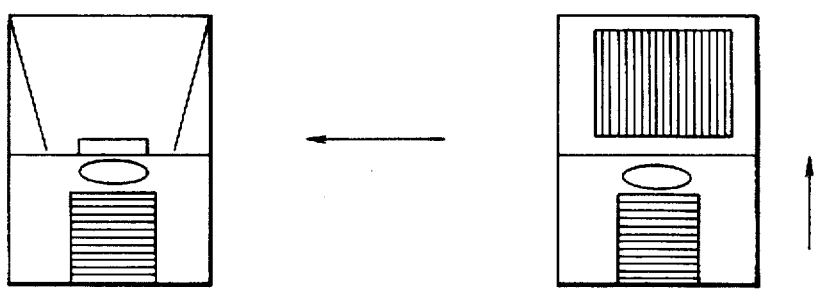

PROJECTION TYPE DISPLAYING APPARATUS HAVING SCREEN

BACKGROUND OF THE INVENTION

1. FIELD OF THE INVENTION

The present invention relates to a projection type displaying apparatus and, more particularly, to a projection type displaying apparatus with a built-in screen, which is capable of projecting an image onto the built-in screen or onto an external separate screen.

2. DESCRIPTION OF THE PRIOR ART

Picture screens of home television receivers (hereafter, TV receivers) have recently been getting wider to display a fine and more detailed television picture, giving television watchers more impressive presence. To meet demand for a wider picture screen, projection type displaying apparatus (hereafter, projection apparatus) are widely used, which use, in place of a large sized cathode ray tube (CRT), a small sized CRT or a light bulb including a liquid crystal display device to project a television picture onto a wide screen.

Depending upon systems for projecting a picture onto a screen, the projection apparatus are classified into two types of the projection apparatus such as a front screen type projection apparatus and a rear screen type projection apparatus. In general, a size of a picture screen being set with little restriction, the front screen type projection apparatus is capable of displaying a larger sized television picture compared with the rear screen type projection apparatus. Meanwhile, the rear screen type projection apparatus has a structure substantially similar to conventional TV receivers and, therefore, has advantage that is easier in manipulation compared with the front screen type projection apparatus.

The conventional front screen type projection apparatus is a displaying apparatus which has a reflection type screen of a size, for example, from approximately 50-inch diagonal to 120-inch diagonal, and which projects a picture onto the reflection type screen from the front side thereof through an optical system. The rear screen type projection apparatus is a displaying apparatus which has a transmission type flat screen of a size, for example, from approximately 40-inch diagonal to 60-inch diagonal, and which projects a picture onto the transmission type flat screen from the rear side thereof through an optical system.

The conventional front screen type projection apparatus projects a picture onto the reflection type screen which is separately installed from the projection apparatus, and, therefore, a distance between a projection lens of the optical system and the reflection type screen can be set with little restriction. Therefore, in general, a wider picture size can be enjoyed in the front screen type projection apparatus than in the rear screen type projection apparatus.

Meanwhile, the rear screen type projection apparatus projects a picture onto a built-in screen, and, therefore, the distance between the projection lens of the optical system and the built-in screen has to be set within a predetermined distance range, which releases a user from a troublesome focus adjustment.

The conventional front screen type projection apparatus can project a wide sized picture, and the distance between the projection lens of the optical system and the screen can be set with little restriction. In other words, it is hard to set the distance in the front screen type projection apparatus and the focus of the projection lens has to be adjusted every time the projection apparatus is used. The front screen type projection apparatus has a drawback that the focus adjustment is troublesome.

Meanwhile, the conventional rear screen type projection apparatus is easy in focus adjustment, but has limitation as to the picture size of the picture to be displayed. The rear screen type projection apparatus uses the built-in screen, and, therefore, the size of the built-in screen can not be made larger than a predetermined size, i.e., the size of the body of the projection apparatus. As described above, the rear screen type projection apparatus has a drawback that the size of a picture to be displayed can not be made wider than the body of the projection apparatus.

It would be apparent to those skilled in the art from the following description of preferred embodiments that the present invention may be modified in various manners and may be applicable to other apparatus.

SUMMARY OF THE INVENTION

The present invention has been made to overcome the above mentioned inconvenience, and has an object to provide a projection type displaying apparatus with a movable built-in screen onto which an image is projected through an image projection pass, which apparatus comprises:

image displaying means for displaying an image;

image projecting means for projecting the image displayed on said image displaying means onto the movable built-in screen through the image projection pass;

position detecting means for detecting a position of the movable built-in screen to judge whether the movable built-in screen is located in the image projection pass; and control means for controlling said image projecting means based on the position of the movable built-in screen detected by said position detecting means.

A further object of the present invention is to provide a projection type displaying apparatus which comprises:

a housing;

a built-in screen adapted to be moved within said housing;

image displaying means for displaying an image;

image projecting means for projecting the image displayed on said image displaying means onto said built-in screen.

Another object of the present invention is to provide a projection type displaying apparatus with a movable built-in screen onto which an image is projected through an image projection pass, which apparatus comprises:

image displaying means for displaying an image;

image projecting means adapted to take predetermined state and state other than the predetermined state, said image projecting means projecting the image displayed on said image displaying means onto the movable built-in screen through the image projection pass, when said image projecting means is in the predetermined state;

position detecting means for detecting a position of the movable built-in screen to judge whether the movable built-in screen is located in the image projection pass;

memory means for storing state other than the predetermined state of said image projecting means; and control means for controlling said image projecting means based on the position of the movable built-in screen detected by said position detecting means.

Still another object of the present invention is to provide a displaying system including a projection type displaying apparatus and an external screen, the projection type displaying apparatus provided with a built-in screen on which an image is projected through an image projection pass, wherein:

the projection type displaying apparatus comprises:
- image displaying means for displaying an image;
- image projecting means for projecting the image displayed on said image displaying means on the built-in screen through the image projection pass;
- driving mechanism for moving the built-in screen; and
- a housing containing said image displaying means, said image projecting means and said driving mechanism, and the external screen comprises:
- a screen provided separately from said housing.

BRIEF DESCRIPTION OF THE DRAWINGS

Other objects and structures of the present invention will be more fully understood from the description, when taken in conjunction with the accompanying drawings, in which:

FIG. 7a–7b are views showing focus patterns and indications of an indicator in a focus adjustment operation in the first embodiment of the projection type displaying apparatus;

FIG. 8 is a flowchart of a displaying process for displaying guidance information on a guidance display unit in the first embodiment of the projection type displaying apparatus;

FIG. 10 is a table including table data, i.e., combinations of projecting distances and projected picture sizes in the first and the second embodiments of the projection type displaying apparatus;

FIG. 17a–17d are views showing focus patterns and indications indicated by an indicator in a focus adjustment operation in the second embodiment of the projection type displaying apparatus.

DETAILED DESCRIPTION OF PREFERRED EMBODIMENTS

Now, preferred embodiments of the present invention will be described in detail with reference to the accompanying drawings.

FIRST EMBODIMENT

Now, the first embodiment of the projection type displaying apparatus according to the present invention will be described with reference to FIGS. 1–9.

Structure of the first embodiment of the projection type displaying apparatus will be described.

Figure 1:
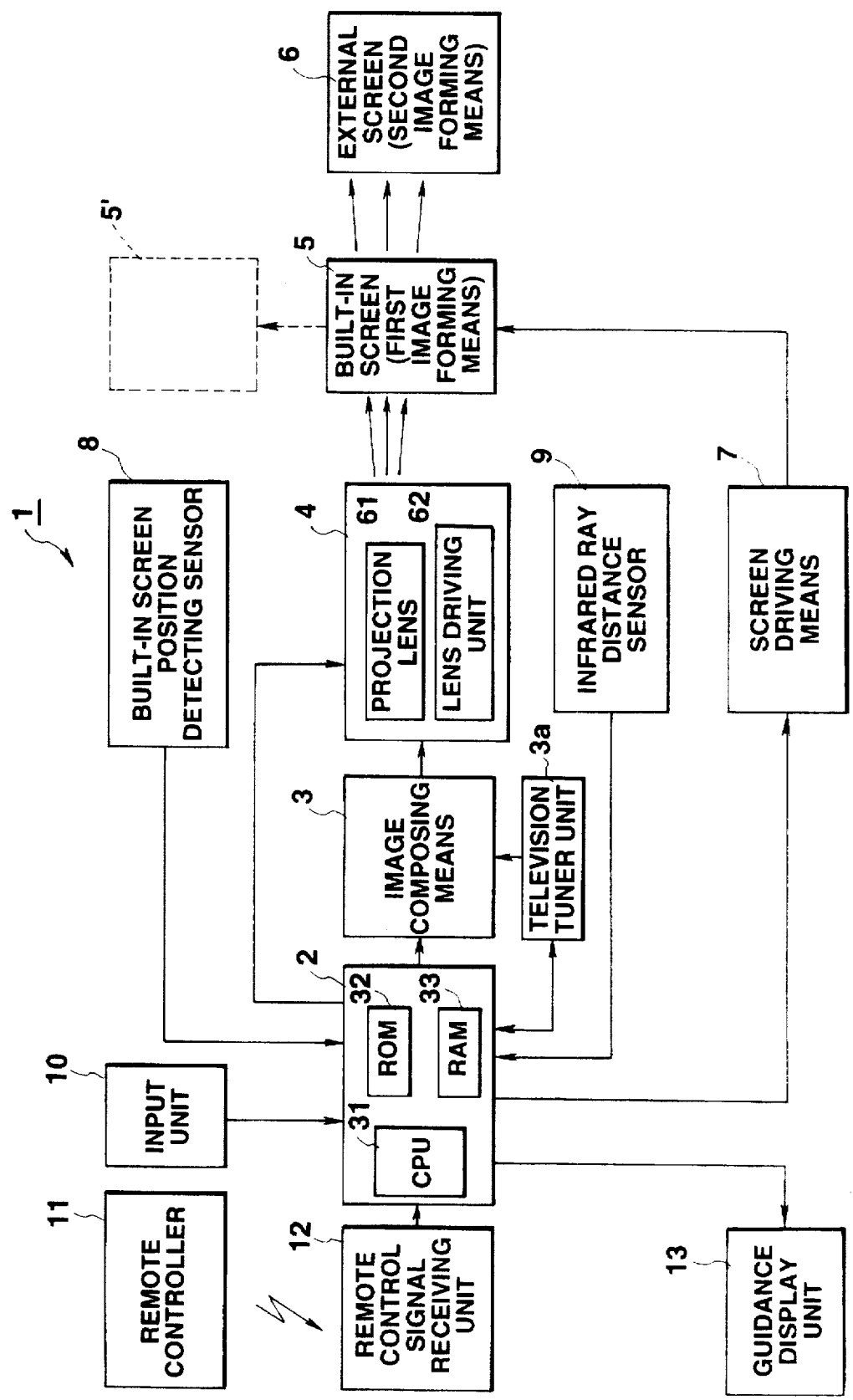
FIG. 1 is a circuit diagram of a first embodiment a projection type displaying apparatus according to the present invention.

FIG. 1 is a circuit diagram of the first embodiment of the projection type displaying apparatus (sometimes, displaying apparatus) 1. As shown in FIG. 1, the projection type displaying apparatus 1 comprises control means 2, image composing means 3, image projecting means 4, a built-in screen (first image forming means) 5, an externally installed screen (external screen, second image forming means) 6, screen driving means 7, a position detecting sensor (position detecting means) 8, an infrared ray distance sensor (distance measuring means) 9, an input unit 10, a remote controller 11 and a remote control signal receiving unit 12. In FIG. 1, a reference numeral 3a denotes a television tuner unit and a numeral 13 denotes a guidance display unit.

The projection type displaying apparatus of the present embodiment is a rear screen type projection apparatus provided with the built-in screen 5 of 10-inch diagonal, and projects, with the built-in screen 5 slidably moved (refer to 5' in FIG. 1), an image or a picture onto the external screen having a projection plane size of 10-inch diagonal. A projection image of an arbitrary projection size is projected onto the external screen 6 of a transmission type or of a reflection type, which is externally installed. The projection size of the projection image ranges from 10-inch diagonal to 60-inch diagonal at the maximum. The projection apparatus has a right/left reverse function for reversing a mirrored image to display a normal image on the external screen 6 of a reflection type.

The control means 2 comprises a Central Processing Unit (CPU) 31, a Read Only Memory (ROM) 32 and a Random Access Memory (RAM) 33. The control means 2 performs various control operations for a displaying process. The CPU 31 runs various programs stored in the ROM 32 based on an input signal entered from the input unit 10. Further, the CPU 31 sends various control signals to function blocks within the projection type displaying apparatus 1 to control them.

The ROM 32 comprises a semi-conductor memory such an Electric Erasable Programmable Read Only Memory (EEPROM), for storing programs and data to be used in the projection type displaying apparatus 1. The RAM 33 comprises a semi-conductor memory such as a Dynamic Random Access Memory (DRAM), which is used as a work area, and is also used to store program data to be used while the CPU 31 is running a program.

Figure 2:
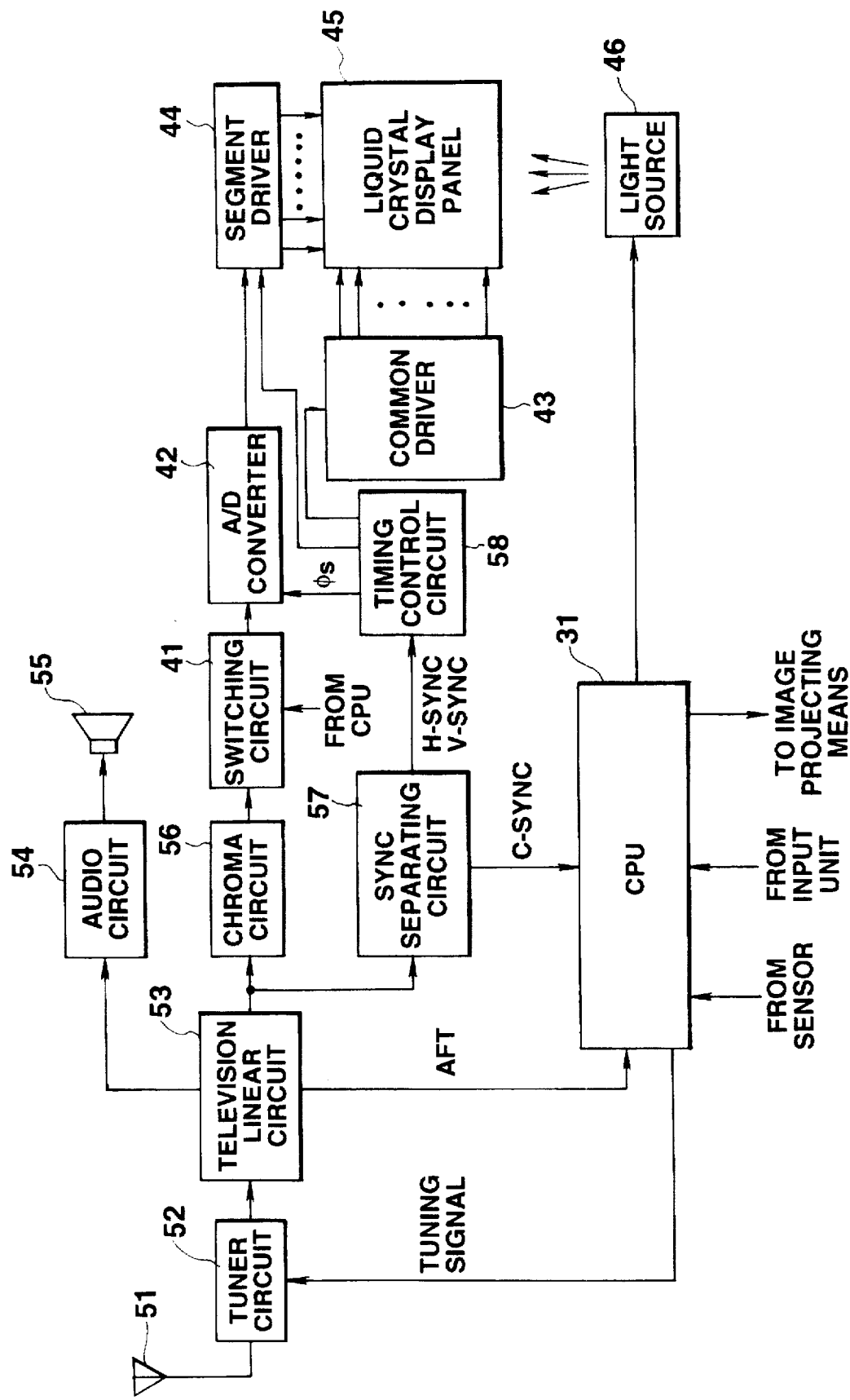
FIG. 2 is a circuit diagram of display means and a television tuner unit in the first embodiment of the projection type displaying apparatus according to the present invention.
Figure 3:
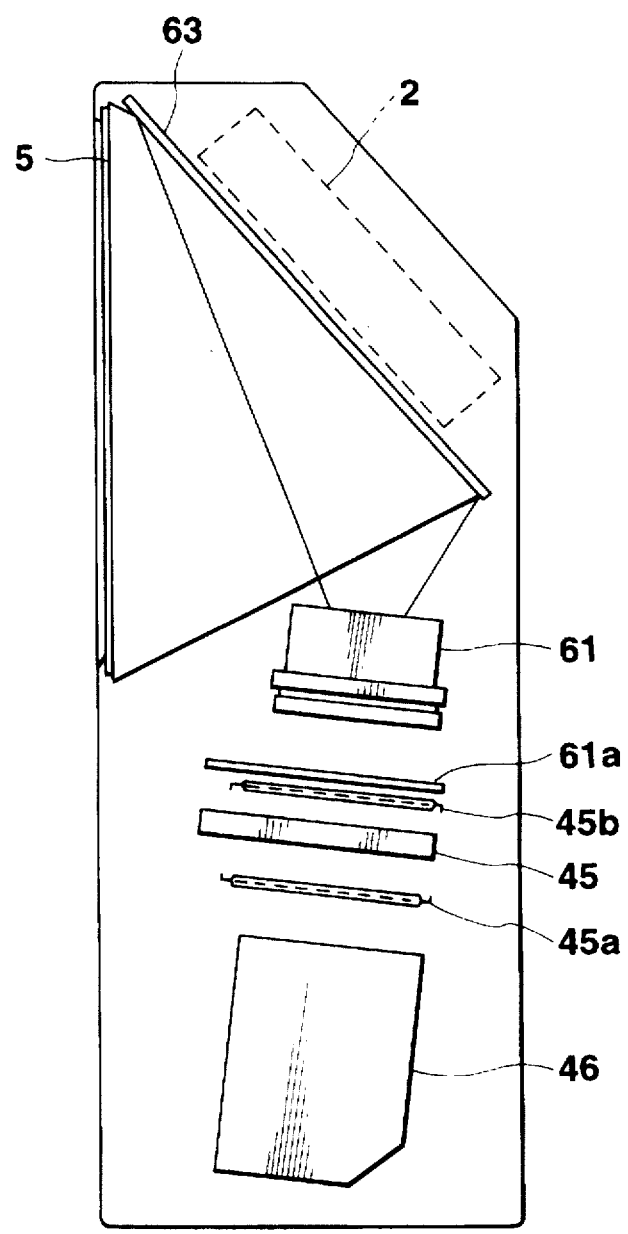
FIG. 3 is a sectional view of an optical system in the first embodiment of the projection type displaying apparatus.

FIG. 2 is a circuit diagram of the image composing means 3 and the television tuner unit 3a. FIG. 3 is a sectional view showing an optical system of the projection type displaying apparatus 1 of the present embodiment.

The optical system of the projection type displaying apparatus 1 comprises a liquid crystal display panel 45 of the image composing means 3, a light source 46 and a projection lens 61 of the image projecting means 4. The image composing means 3 further comprises a switching circuit 41, an A/D converter 42, a common driver 43, a segment driver 44, the liquid crystal display panel 45 and the light source 46. The image composing means 3 processes image data selectively entered through the switching means 41 to compose an image or a picture on the liquid crystal display panel 45 for displaying same on the built-in screen 5 or on the external screen 6.

The switching means 41 serves to switch image data to be input to the A/D convertor 42, based on the control signal supplied from the CPU 31. The A/D convertor 42 converts a chroma signal (an analog signal) into a digital data.

The common driver 43 is a driving circuit for driving scanning electrodes (common electrodes) of the liquid crystal display panel 45. The segment driver 44 is a driving circuit for driving data electrodes (segment electrodes) of the liquid crystal display panel 45.

As shown in FIG. 3, the liquid crystal display panel 45 comprises a liquid crystal light bulb including a color Super Twisted Nematic (STN) Liquid Crystal Display Panel (LCD) with polarizing plates 45a, 45b provided on both sides thereof. The light source 46 comprises a metal halide lamp for illuminating the liquid crystal light bulb.

For the liquid crystal light bulb, a color Thin Film Transistor (TFT) active LCD may be used in place of the STN type color LCD. In this case, it is necessary to use a driving circuit suitable for the liquid crystal light bulb to be used.

The television tuner unit 53a includes an antenna 51, a tuner circuit 52, a television linear circuit 53, an audio circuit 54, a speaker 55, a chroma circuit, a sync separating circuit 57 and a timing control circuit 58. The television tuner unit 3a outputs a broadcasting television signal image to the image composing means 3 as an image or a picture to be composed thereby.

Now, a process from a receiving process of a television image by the television tuner unit 3a to a displaying process of the image on the liquid crystal display panel 45 of the image forming means 3 will be described in detail.

A broadcasting television electric wave is supplied to the tuner circuit 52 through the antenna 51. The tuner circuit 52 selects a television signal of a designated television channel in accordance with a tuning control signal sent from the CPU 31, and converts the selected television signal into an intermediate frequency signal. The intermediate frequency signal is sent to the television linear circuit 53 from the tuner circuit 52.

The television linear circuit 53 comprises an intermediate frequency amplifier, a video detecting circuit, a video signal amplifier and an AFT detecting circuit (these circuits are not shown). The intermediate frequency amplifier amplifies the intermediate frequency signal sent from the tuner circuit 52. The video detecting circuit executes a detecting operation on the amplified intermediate frequency signal. An audio intermediate frequency signal detected from the intermediate frequency signal is supplied to the audio circuit 54.

The audio circuit 54 comprises an audio detecting circuit rand an audio amplifier (both not shown). The audio detecting circuit detects an audio signal from the audio intermediate frequency signal supplied from the television linear circuit 53. The detected audio signal is amplified by the audio amplifier and is audibly output through the speaker 55.

The video signal output from the video detecting circuit of the video linear circuit 53 is amplified by the video amplifier and is transferred to the chroma circuit 56 and the sync separating circuit 57.

The chroma circuit 56 generates a chroma signal based on the video signal supplied from the television linear circuit 53. The chroma signal is sent to the A/D convertor 42 through the switching circuit 41. At this time, in accordance with a control signal supplied from the CPU 31, the switching circuit 41 connects the chroma circuit 56 with the A/D convertor 42.

Meanwhile, the sync separating circuit 57 separates a horizontal sync signal H-SYNC and a vertical sync signal V-SYNC from the video signal output from the television linear circuit 53. A composite sync signal C-SYNC is output to the CPU 31 for controlling a tuning operation, and the horizontal sync signal H-SYNC and the vertical sync signal V-SYNC are supplied to the timing control circuit 58.

The AFT detecting circuit of the television linear circuit 53 executes an AFT detection on the intermediate frequency signal supplied from the intermediate frequency amplifier to detect an AFT signal, and sends the AFT signal to the CPU 31 for controlling the tuning operation.

The CPU 31 with a tuning control function is supplied with a key input signal such as tuning setting data and a tuning up/down instruction from the input unit 10. A tuning signal to be supplied to the tuner circuit 52 is produced based on tuning up/down operation performed on the input unit 10 or the AFT signal supplied from the television linear circuit 53.

The timing control circuit 58 generates a sampling signal øs and a timing signal for controlling a displaying process, based on the horizontal sync signal H-SYNC and the vertical sync signal V-SYNC supplied from the sync separating circuit 57. The generated sampling signal øs is sent to the A/D convertor 42, and the timing signal is supplied to the common driver 43 and the segment driver 44 to control operation of the drivers.

In synchronism with the sampling signal øs output from the timing control circuit 58, the A/D convertor 42 samples the chroma signal (analog data) output from the chroma circuit 56 to obtain digital data of 3 to 4 bits. The obtained digital data is supplied to the segment driver 44.

The common driver 43 generates a scanning signal based on the timing signal supplied from the timing control circuit 58. The scanning signal successively drives the common electrodes of the liquid crystal display panel 45. The segment driver 44 successively reads in video data of 3 to 4 bits supplied from the A/D convertor 42, based on the timing signal sent from the timing control circuit. When video data for one horizontal scanning line have been read in, a gradient signal is produced based on the video data for one horizontal scanning line. The segment electrodes of the liquid crystal display panel 45 are driven by the gradient signal.

Through the above process, the image received by the television tuner unit 3a is displayed on the liquid crystal display panel 45 of the image composing means 3.

The image projecting means 4 comprises a projection lens 61 (FIG. 1), a Fresnel lens 61a, a lens driving unit 62 (FIG. 1) and a reflection mirror 63. The projection lens 61 and the Fresnel lens 61a are made of plastics, and have a short focal distance. These lenses serve to enlarge and project an image light which is emitted from the metal halide lamp and transmitted through the liquid crystal light bulb, as shown in FIG. 3. The lens driving unit 62 of FIG. 1 moves the projection lens 61 forwards and/or rearwards along the optical axis thereof. The reflection mirror 63 guides the image light projected from the projection lens 61 to a rear surface of the built-in screen 5. The image projection means 4 enlarges and projects an image displayed on the liquid crystal display panel of the image forming means 3 onto the built-in screen 5 or the external screen 6.

Figure 4A:
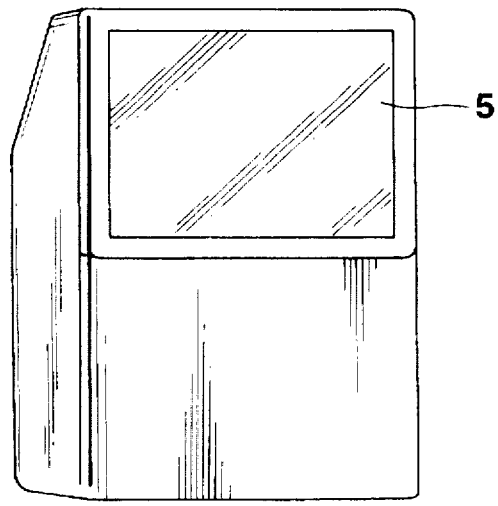
FIGS. 4a and 4b are views showing a transmission type screens in the first embodiment of the projection type displaying apparatus.
Figure 4B:
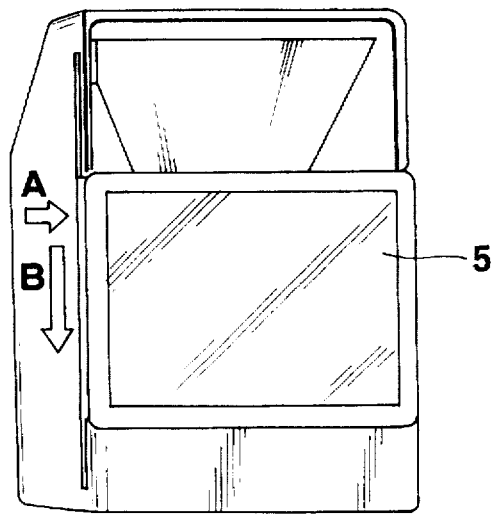

FIG. 4a is a view showing the projection type displaying apparatus, in which an image is projected onto the built-in screen 5, and FIG. 4b is a view showing the projection type displaying apparatus, in which an image is projected on the external screen 6.

As shown in FIG. 4a, the built-in screen 5 is a screen of a transmission type, which includes Fresnel lens of a 10-inch diagonal size. When an image of a size larger than the size of 10-inch diagonal is to be projected, the displaying apparatus 1 with the built-in screen 5 pulled inwards and slidably moved downwards, as shown by arrows A and B in FIG. 4b, projects the image of an arbitrary size from 10 to 60-inch diagonal at maximum onto the external screen 6 through the reflection mirror 63.

In the present embodiment, the external screen 6 comprises a transmission type screen having a size of 40-inch diagonal, and is disposed in front of the built-in screen 5 of the projection type displaying apparatus 1.

Figure 5A:
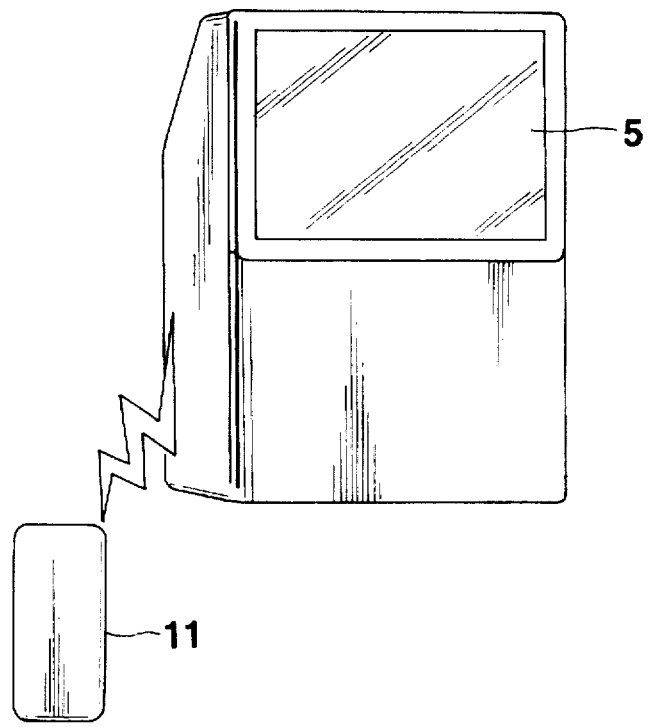
FIGS. 5a and 5b are views showing the transmission type screens in the first embodiment of the projection type displaying apparatus, which screens are controlled by a remote controller.
Figure 5B:
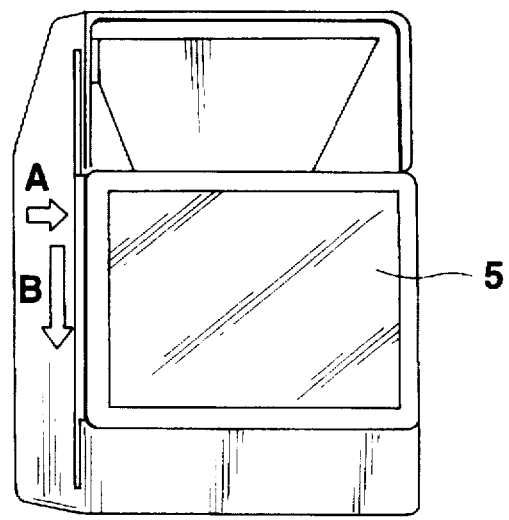

FIGS. 5a and 5b are views showing a slidable movement of the built-in screen 5 controlled by a remote controller 11.

The screen driving means 7 moves automatically and slidably the built-in screen 5 to a lower position in response to a control signal which is input through a remote control signal receiving unit 12 and the CPU 31 when an open/close button of the remote controller 11 is depressed.

A position detecting sensor 8 judges whether the built-in screen 5 locates at a normal position shown in FIG. 4a or at the lower position shown in FIG. 4b.

Figure 6A:
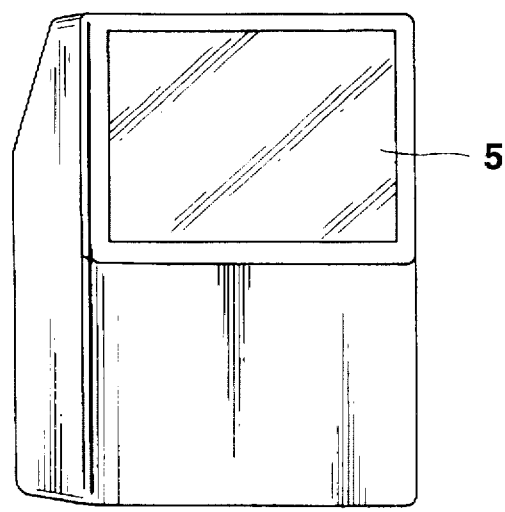
FIGS. 6a and 6b are views showing a position of an infrared ray sensor in the first embodiment of the projection type displaying apparatus.
Figure 6B:
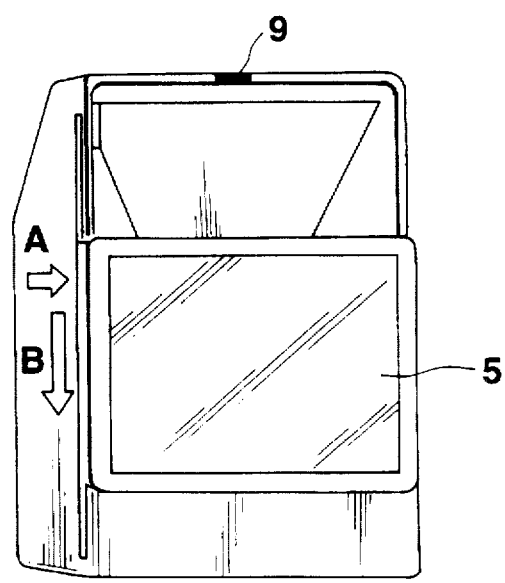

FIG. 6b is a view showing a position on the projection type displaying apparatus where an infrared ray distance sensor 9 is installed. The infrared ray distance sensor 9 uses infrared rays to measure a distance between the projection lens 61 and the external screen 6. As shown in FIG. 6a, the infrared ray distance sensor is usually hidden by a frame of the built-in screen 5, and is exposed when the built-in screen 5 is slidably moved to the lower position.

The input unit 10 is for inputting instructions to instruct the projection type displaying apparatus 1 to perform various operations. The remote controller 11 is used to input instructions similar to those input from the input unit 10 to the projection type displaying apparatus 1 from a position apart therefrom.

The displaying apparatus 1 is provided with a focus adjustment button (+), a focus adjustment button (−) and a decision button, which are common to the input unit 10 and the remote controller 11. Meanwhile, as described above, the remote controller 11 is proved with the open/close button.

The remote control signal receiving unit 12 receives a radio input signal from the remote controller 11, and transmits the received input signal to the control means 2.

A guidance display unit 13 displays a distance from the projection lens 61 to the external screen 6, which distance was measured by the infrared ray distance sensor 9. Further, when a desired image having a size from 10-inch diagonal to 60-inch diagonal is input to the input unit 10, the guidance display unit 13 displays a distance to be set between the projection lens 61 to the external screen 6, which distance is calculated from data given in the Table 1 of FIG. 10.

Now, operation of the first embodiment of the projection type displaying apparatus will be described.

FIGS. 7a–7d are views showing by way of example focus patterns and indications of an indicator, which are displayed while focus is adjusted.

The focus patterns shown in FIGS.7a–7d are pattern images, which a user watches to adjust focus of an projected image, and the indicator is for indicating a size of the projected image. As shown at FIG. 7a the first embodiment of the projection type displaying apparatus 1 usually operates as a rear screen projection type displaying apparatus, in which an image is projected on the built-in screen 5 of 10-inch diagonal. In this case, a pointer of the indicator indicates a "10 inch size".

Further, as shown at 7b when the built-in screen 5 is slidably moved to the lower position in response to operation of the remote controller 11, the position detecting sensor 8 determines that the built-in screen 5 has moved to the lower position. Then, an operation mode of the displaying apparatus 1 is changed to an automatic focussing mode, in which the pointer of the indicator automatically moves from "10 inch" to "20 inch" through 60 steps and further from "20 inch" to "40 inch" through another 60 steps, and the lens driving unit 62 automatically drives the projection lens 61 so as to bring an image in focus at a projection distance of 40 inches.

To set the size of the image to be projected on the screen so as to fall within a range from a 10-inch diagonal size to a 40-inch diagonal size or larger than 40-inch diagonal, the size of the image can be changed step by step by manipulating the remote controller 11 so as to operate the focus adjusting (+) button or the focus adjusting (−) button. Meanwhile, the projection lens 61 is driven so as to bring the image in focus at a projection distance, at which the image of a given size between 10 and 40-inch diagonal sizes or between 40 and 60-inch diagonal sizes is formed.

In this connection, when the focus adjusting (+) button or the focus adjusting (−) button of the remote controller 11 is kept depressed for a predetermined time, the size of the image may be changed continuously.

Watching the focus pattern, the user can fine-adjust the focus of the projected image by means of the projection type displaying apparatus 1, the focus adjusting (+) button or the focus adjusting (−) button of the remote controller 11.

Thereafter, when a decision button is depressed, the screen is cleared, and finally decided adjustment values are stored in the RAM 33.

When the built-in screen 5 is moved to the original position by operation of the remote controller 11, the pointer of the indicator returns from "60 inch" to "10 inch" through 180 steps, and, at the same time, the lens driving unit 62 moves the projection lens 61 so as to bring the focus on the built-in screen. In this way, in the present embodiment, the focus adjustment is automatically executed when the projection image has been set to a desired size.

FIG. 8 is a flowchart of a displaying process for displaying guidance information on the guidance display unit 13.

In the automatic focussing mode, the focus adjustment for the projection lens 61 is performed when the size of the projection image is decided, but the external screen 6 or the projection type displaying apparatus 1 (precisely, the projection lens 61) has not been moved to a right position.

In the present embodiment, the guidance information necessary for setting are displayed on the guidance display unit 13, allowing easy setting.

When it is determined that the built-in screen 5 has been moved, the infrared ray distance sensor 9 measures a distance between the projection lens 61 and the external screen (step S1). Then, a size of the projection image is calculated referring to data given in Table 1 that corresponds to the measured distance (step S2). The measured distance between the projection lens 61 and the external screen 6, and the size of the projection image are displayed on the guidance display unit 13 (step S3).

It is judged whether the size of the projection image is designated (step S4). When the size of the projection image is designated, the most suitable distance between the projection lens 61 and the external screen is calculated from the designated size and corresponding data given in the Table 1 (step S5). A difference between the calculated most suitable distance and the present distance between the projection lens 61 and the external screen 6 is displayed together with the designated size of the projection image, as shown in FIG. 9.

Figure 9:
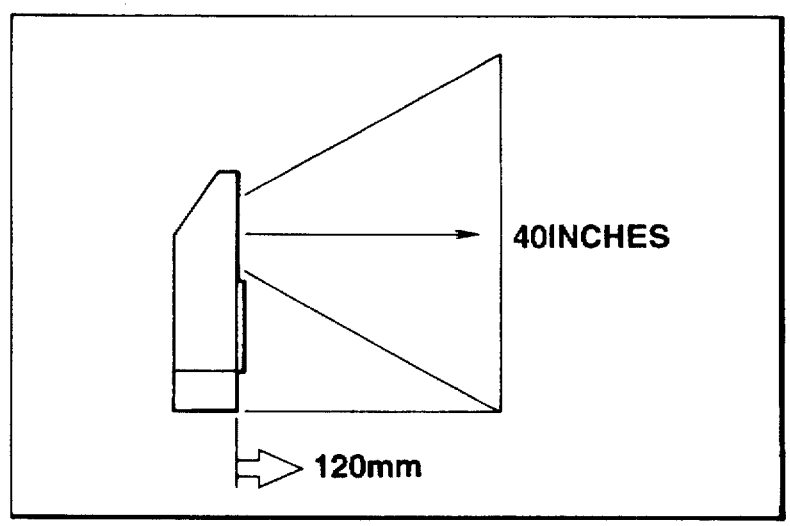
FIG. 9 is a view showing by way of example indications displayed on the guidance display unit of the first and a second embodiment of the projection type displaying apparatus.

In FIG. 9, an example is shown, in which the external screen 6 is fixed at a certain position and a distance (120 mm) is displayed, over which the projection type displaying apparatus 1, which is comparably easy to be moved, is moved to adjust the focus of an image projected on the external screen 6.

Meanwhile, when the size of the projection image is designated at step S4, it is judged whether an instruction is input during a predetermined time (step S7). When no instruction is input, indications on the guidance display unit 13 are cleared (step S8), and when an instruction is entered, the operation goes to a process of step S4 with the indications displayed on the guidance display unit 13.

In this way, since various data necessary for setting the displaying apparatus 1, the external screen 6 and the projection lens are displayed on the guidance display unit 13, the user can set these apparatus easily.

In the present embodiment described above, with the focus adjustment function to be performed in the automatic focusing mode, the user is released from troublesome focus adjusting manipulation, and is allowed to make a fine focus adjustment according to his/her desire.

As have been described above, with an electric motor driving screen using the screen driving means 7, the built-in screen 5 is controlled to slidably move by the remote controller 11, allowing an easy setting.

In the above embodiment, since the STN color liquid crystal display panel is used as the liquid crystal light bulb, and the STN color liquid crystal display panel comprises the liquid crystal display panel 45 with the polarizing plates 45a, 45b provided on both sides thereof, as shown in FIG. 3, the polarizing plates 45a, 45b produce loss in light energy.

More specifically, 60% of natural light emitted from the light source 46 is absorbed by the polarizing plate 45a in the course of allowing polarized light to pass through therefrom. The absorbed light is changed to heat, raising temperature of the polarizing plate 45a. 40% of the light, i.e., light passing through the polarizing plate 45a is guided to the liquid crystal display panel 45 to illuminate the same. The light passing through the liquid crystal display panel 45 reaches another polarizing plate 45b and further 60% of the passing light is absorbed therein. Therefore, approximately 20% of the original natural light is used.

If not only light component polarized in one direction is allowed to pass through the polarizing plates 45a, 45b, but all natural light emitted from the light source 46 is converted to light polarized in one direction by the polarizing plates 45a, 45b, not only available light volume will be increased, but deterioration of the polarizing plates 45a, 45b due to heat will be avoided.

To use light from the light source 46 more efficiently, it will be useful to use a liquid crystal light bulb using liquid crystals of a high molecular dispersion type in place of the STN color LCD panel and the color TFT active matrix LCD panel.

Contrary to the Super Twisted Nematic (STN) Liquid Crystal Display panel (LCD) provided with polarizing plates 45a, 45b, dispersion and absorption of rays of incident light produces contrast of display on the liquid crystal light bulb using the high molecular dispersion liquid crystals. With no electric field applied to the liquid crystal light bulb, rays of incident light are scattered or dispersed in the liquid crystal light bulb using the liquid crystals of a high molecular dispersion type. With electric field applied to the liquid crystal light bulb, encapsulated nematic liquid crystals are aligned in a direction of the electric field and the liquid crystals of a high molecular dispersion type are brought to a transmitting state.

The high molecular dispersion liquid crystals, which do not use the polarizing plates, realize brightness three times of that of Twisted Nematic liquid crystals. Further, when used as a guest host display, the high molecular dispersion liquid crystals realizes a wide view angle and shows a higher response speed (2–5 ms) than Twisted Nematic liquid crystals, and, therefore, allows more efficient use of transmitting light in comparison with that in the described embodiment.

Though having been described specifically with reference to the preferred embodiment, the present invention is not limited to the above first embodiment and may be modified in various manners. All the modifications and applications of the present invention will be within the scope and spirit of the present invention, so that the scope of the present invention should be determined only by what is recited in the present appended claims and their equivalents.

For example, in the above described embodiment of the invention, in consideration of increase in power consumption, rise in temperature of the apparatus body and deterioration of parts used in the apparatus, the metal halide lamp is employed as the light source 46, but a halogen lamp and a xenon lamp may be used so as to meet the above conditions.

Further, in consideration of weight of the apparatus and optical characteristics, a plastic optical lens is used in the above embodiment, but number of optical lenses and material of the lenses may be arbitrarily selected in consideration of required characteristics thereof.

Further, the guidance display unit 13 in provided on the apparatus in the embodiment but may be mounted on the remote controller 11.

In the above embodiment, a transmitting type screen of 40-inch diagonal is used as the external screen 6, but any size of screen may be used for the external screen. Further, a reflection type screen may be used in place of the transmitting type screen with a function of reversing right and left.

In the above embodiment, a color LCD panel is used as the liquid crystal display panel 45 for a color display, but three liquid crystal panels for three colors R (red), G (green) and B (blue) may be used or a single liquid crystal display panel with R, G and B pixels disposed thereon may be used for displaying a color image. If three-color pixels are disposed at the same pitches on the surface of the liquid crystal display panel, an enlarged image projected image through the same will be rough compared with an image projected through three display panels. Since the liquid crystal display panel with R, G and B pixels disposed thereon is simple in structure, the apparatus using the same may be made compact in size, light in weight and low in manufacturing costs.

SECOND EMBODIMENT

Now, a second embodiment of the projection type displaying apparatus according to the present invention will be described with reference to FIGS. 11–18.

Structure of the second embodiment of the projection type displaying apparatus will be described.

Figure 11:
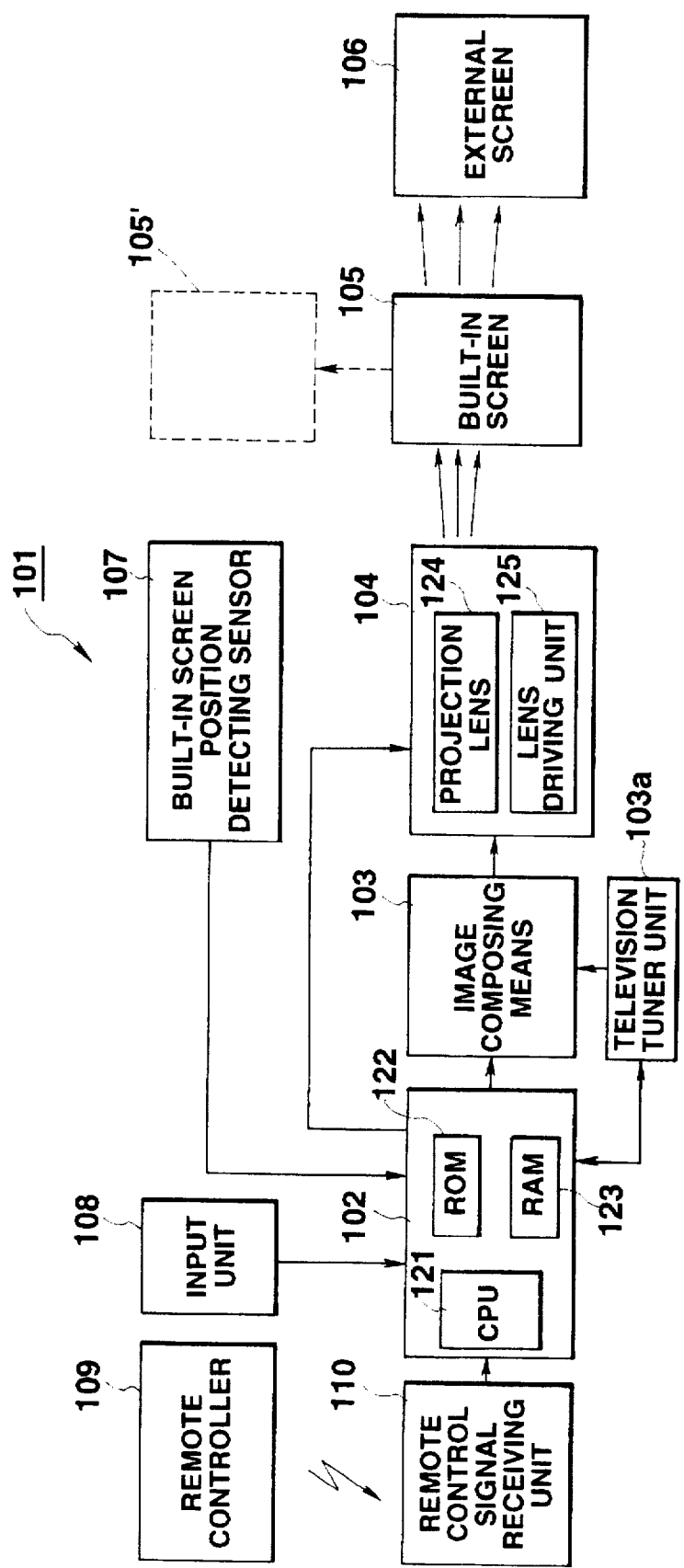
FIG. 11 is a circuit diagram of the second embodiment of the projection type displaying apparatus according to the present invention.

FIG. 11 is a circuit diagram of the first embodiment of the projection type displaying apparatus (sometimes, displaying apparatus) 101. As shown in FIG. 11, the projection type displaying apparatus 101 comprises control means 102, image composing means 103, image projecting means 104, a built-in screen 105, an externally installed screen (external screen) 106, a position detecting sensor (position detecting means) 107, an input unit 108, a remote controller 109 and a remote control signal receiving unit 110. In FIG. 11, a reference numeral 3a denotes a television tuner unit.

The projection type displaying apparatus 101 of the second embodiment is a rear screen type projection apparatus which is provided with the built-in screen 105 of 10-inch diagonal, and projects, with the built-in screen 105 slidably moved (refer to 5' in FIG. 1), an image or a picture onto the external screen 106 having a projection plane size of 10-inch diagonal. A projection image of an arbitrary projection size is projected onto the external screen 106 of a transmission type or of a reflection type, which is externally installed. The projection size of the projection image ranges from 10-inch diagonal to 60-inch diagonal at the maximum. The projection apparatus has a right/left reverse function for reversing right and left an image to be formed on the external screen 106 of a reflection type.

The control means 102 comprises a Central Processing Unit (CPU) 121, a Read Only Memory (ROM) 122 and a Random Access Memory (RAM) 123. The control means 102 performs various control operations for a displaying process. The CPU 121 runs various programs stored in the ROM 122 based on an input signal entered from the input unit 108. Further, the CPU 121 sends various control signals to function blocks within the projection type displaying apparatus 101 to control them.

The ROM 122 comprises a semi-conductor memory such as an Electric Erasable Programmable Read Only Memory (EEPROM), for storing programs and data to be used in the projection type displaying apparatus 101. The RAM 123 comprises a semi-conductor memory such as a Dynamic Random Access Memory (DRAM), which is used as a work area and is used to store program data to be used while the CPU 121 is running a program.

Figure 12:
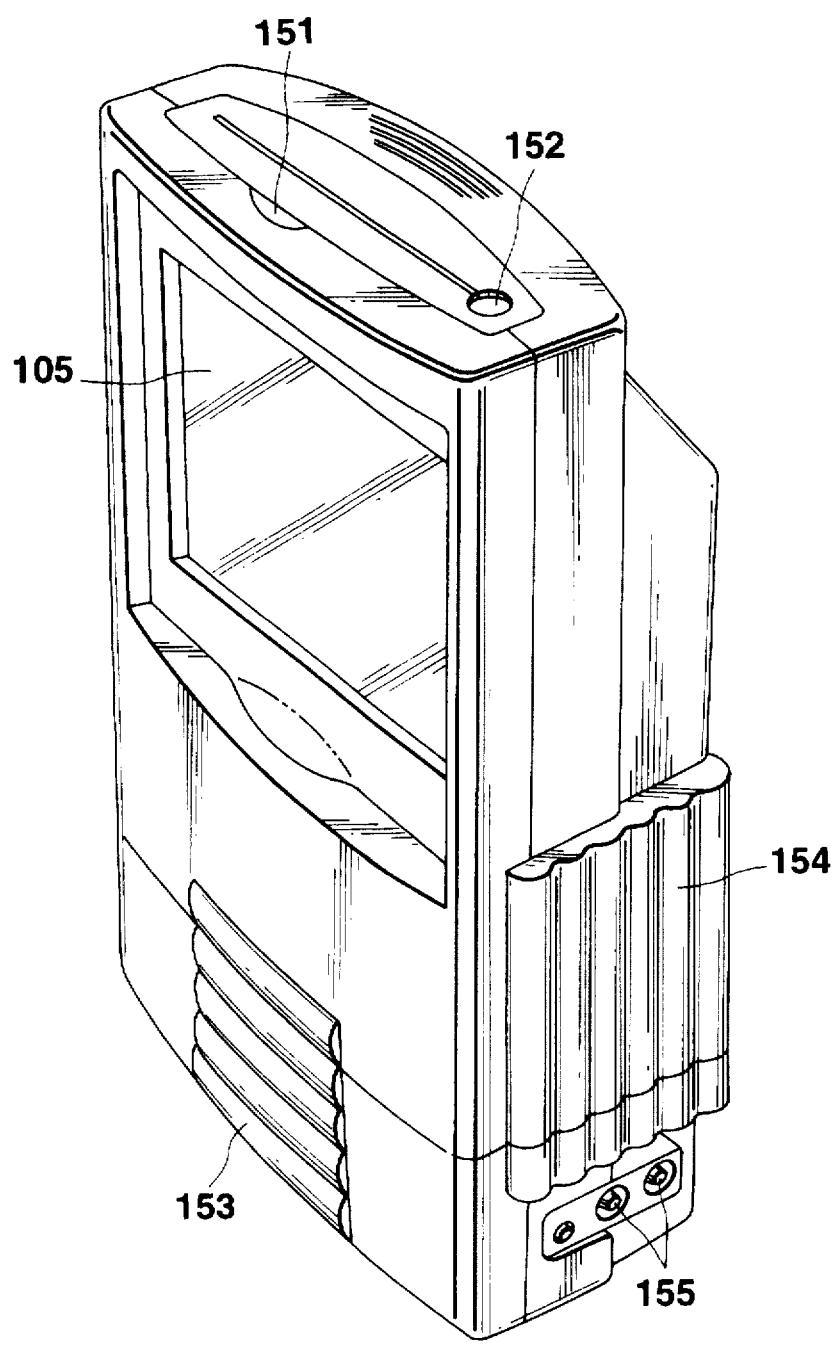
FIG. 12 is a view showing a built-in screen in operation of the second embodiment of the projection type displaying apparatus.
Figure 13:
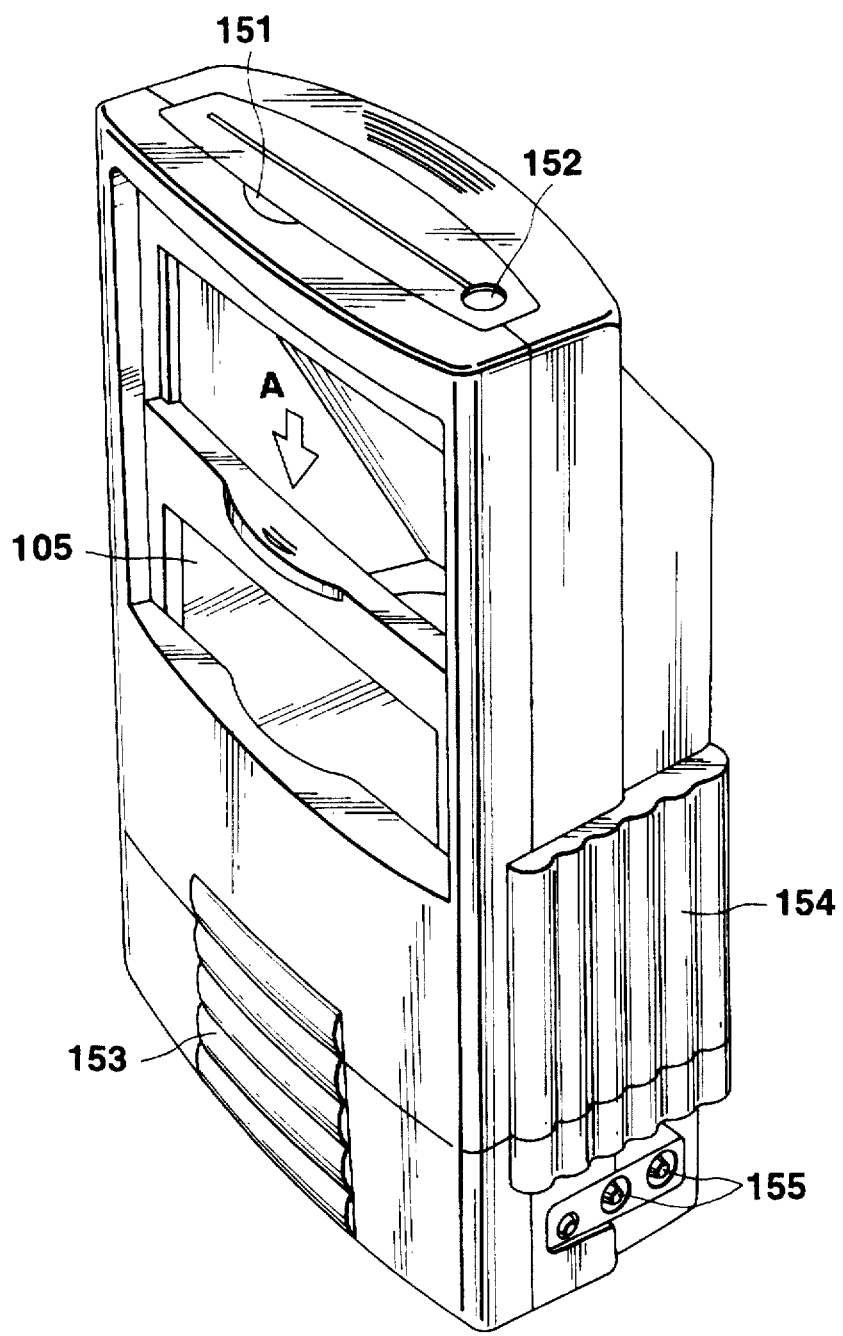
FIG. 13 is a view showing the built-in screen of the second embodiment of the projection type displaying apparatus, which screen is being slidably moved.
Figure 14:
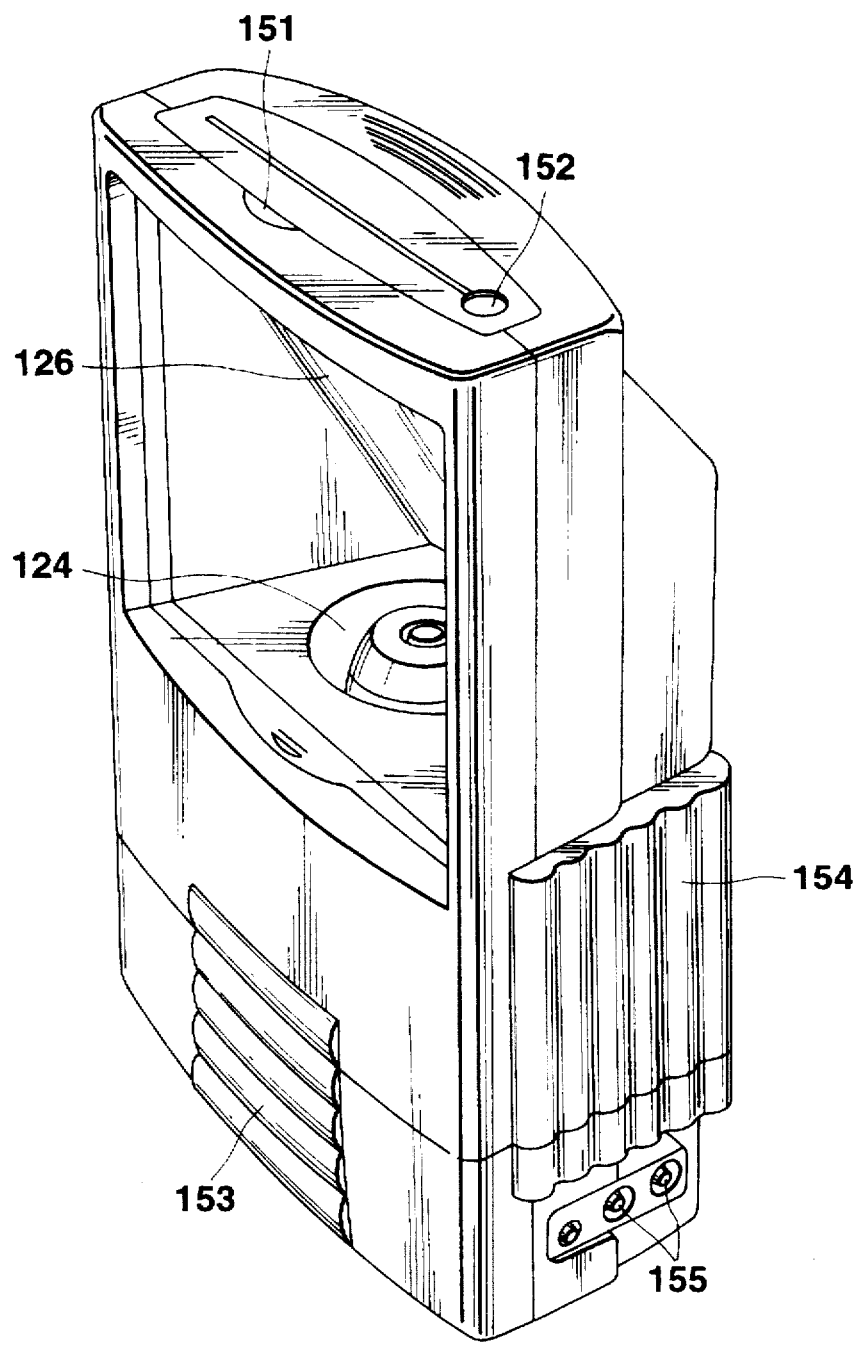
FIG. 14 is a view showing the second embodiment of the projection type displaying apparatus, which is used in combination with an external screen.

Structure of the image composing means 103 and the television tuner unit 103a in the second embodiment is similar to that of the first embodiment of FIG. 2. A liquid crystal display panel 131 is also similar to that (FIG. 3) in the first embodiment. Further description thereof will be omitted. FIGS. 12–14 are perspective views of the second embodiment of the projection type displaying apparatus 101 of the present invention. FIG. 12 is a perspective view of the projection type displaying apparatus 101 with the built-in screen 105 being in use. FIG. 13 is a perspective view of the projection type displaying apparatus 101 with the built-in screen 105 slidably moved downwards. FIG. 14 is a perspective view of the projection type displaying apparatus 101 which is used together with the external screen (not shown) 106.

In FIGS. 12 and 13, a reference numeral 151 denotes a slide switch button, 152 is a power button, 153 is a window for receiving remote control rays, 154 is an exhaust louver and 155 is an input port or a video input/output port including a video input terminal.

The built-in screen 105 is a transmission type screen comprising a Fresnel lens of 10-inch diagonal shown in FIG. 12. In case an image of more than 10-inch diagonal is displayed, the built-in screen 105 is slidably moved downwards by self-weight thereof as shown by an arrow A in FIG. 13 when the slide switch button 151 is depressed. Then, an image of a given size from 20-inch to 60-inch diagonal is projected via a reflection mirror 126 onto the external screen 106 which is installed in front of the displaying apparatus 101.

Figure 15:
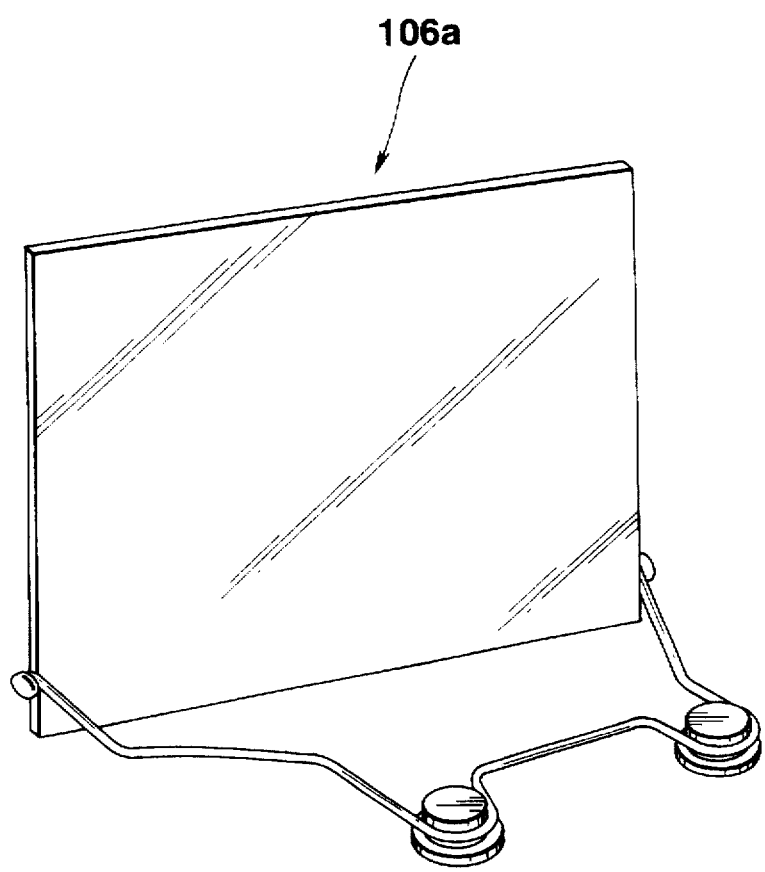
FIG. 15 is a view showing the external screen of 40-inch diagonal.
Figure 16:
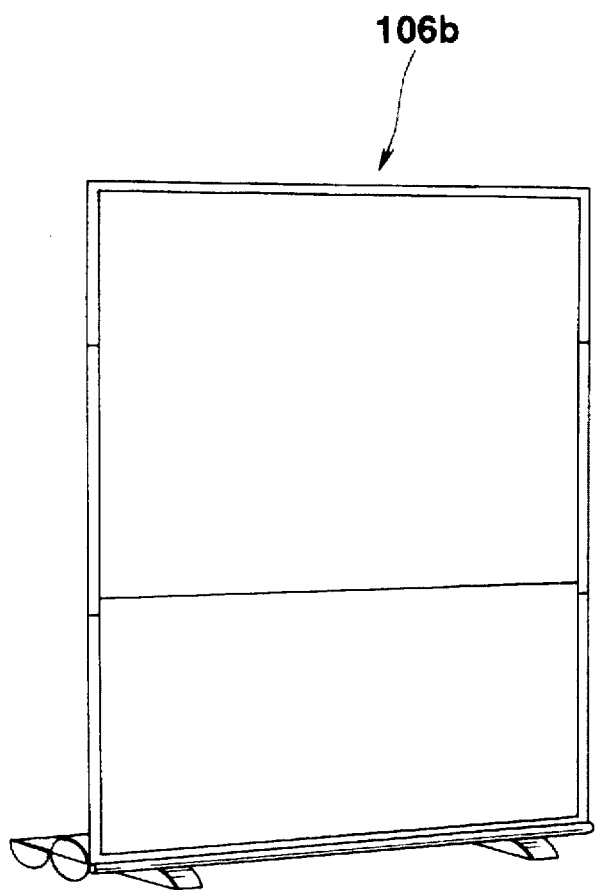
FIG. 16 is a view showing the external screen of 60-inch diagonal.

In FIGS. 15 and 16 are shown external screens which are used together with the displaying apparatus 101. FIG. 15 is a perspective view of an external screen 106a of 40-inch diagonal. FIG. 16 is a perspective view of an external screen 106b of 60-inch diagonal.

The external screen 106 comprises a transmission type screen 106a of 40-inch diagonal shown in FIG. 15 or a transmission type screen 106b of 60-inch diagonal shown in FIG. 16. The external screen 106 is installed in front of the reflection mirror 126 of the projection type displaying apparatus 101, on which an image to be projected on the external screen 106 is displayed.

A position detecting sensor 107 judges whether the built-in screen 105 locates at a normal position as shown in FIG. 12 or at a lower position as shown in FIG. 14.

The input unit 108 is for inputting instructions to make the projection type displaying apparatus 101 perform various operations. The remote controller 109 is used to instruct the displaying apparatus 101 from a remote position from the displaying apparatus 101. A focus adjustment (+) button, a focus adjustment (−) button and a decision button are provided on both the input unit 108 and the remote controller 109. The remote controller 109 is provided with the open/close button. The remote control signal receiving unit 110 receives a radio (infrared ray) input signal transmitted from the remote controller 109.

When an input signal designating a desired image size selected from among 20-inch diagonal to 60-inch diagonal is input to the input unit 108, a distance between a projection lens 124 and the external screen 106 is calculated and displayed from data given in Table stored in the ROM 122, which data define relationship between projecting distances and image sizes.

Now, operation of the second embodiment of the projection type displaying apparatus 101 will be described.

FIGS. 17a–17d are views showing by way of example focus patterns and indications of the indicator, which are displayed on a guidance display unit during a focus adjusting process. The focus patterns of FIG. 17a–17d are referred to adjust the focus of an projection image projected on the screen. The indication of the indicator indicates a size of the projection image to be projected onto the screen.

As shown at FIG. 17a the projection type displaying apparatus 101 works in a normal mode as a rear screen type projection displaying apparatus which projects an image onto the built-in screen 105 of 10-inch diagonal.

Upon depression of the slide switch button 151, the built-in screen 105 moves slidably downwards as shown at FIGS. 17a and 17d. Then, the position detecting sensor 107 determines that the built-in screen 105 has moved, and operation mode is switched to the automatic focusing mode, in which the projection lens 124 is automatically driven based on a last stored value (from 20-inch diagonal to 60-inch diagonal) so as to adjust the focus of the projection image at a projecting distance of the last memory value.

The last memory stores the size (such as 10-inch, 60-inch and so on) of the projection image last projected onto the external screen 106. When the external screen 106 is installed at a predetermined position and the projection type displaying apparatus 101 is set at a fixed position, a user is not required to adjust the focus to project a projection image onto the external screen 106.

For the initial setting, for example, a size of 40-inch has been stored in the RAM 123 and a fine adjustment is executed by operating the focus adjusting (+) button or the focus adjusting (−) button with reference to the position where the external screen is actually set. Then, the fine adjusted value is stored as the last value in the RAM 123. When an image of a given image size among size from 20-inch diagonal to 40-inch diagonal or among sizes from 40-inch to 60-inch diagonal is projected and displayed, the image size can be adjusted step by step by operating the focus adjusting (+) button or the focus adjusting (−) button of the remote controller 109. At the same time, the projection lens 124 is driven so as to adjust the focus at a projecting distance corresponding to the image size of the projected and displayed image.

The image size can be continuously changed by keeping depression of the focus adjusting (+) button or the focus adjusting (−) button for a predetermined time. Watching the focus pattern, the user can make fine focus adjustment by operating the focus adjusting (+) button or the focus adjusting (−) button of the displaying apparatus 101 or the remote controller 109.

Thereafter, when the decision button is depressed, the image is cleared and the finally adjusted value is stored as the final value in the RAM 123.

When the built-in screen 105 is moved to the original position by operation of the remote controller 109, the pointer of the indicator returns to "20 inch" from "60 inch" as shown at (d) in FIG. 17, and the projection lens 124 is driven to bring the focus on the built-in screen 105. In this manner, the focus of the projection lens 124 is automatically adjusted in accordance with the desired image size.

Figure 18:
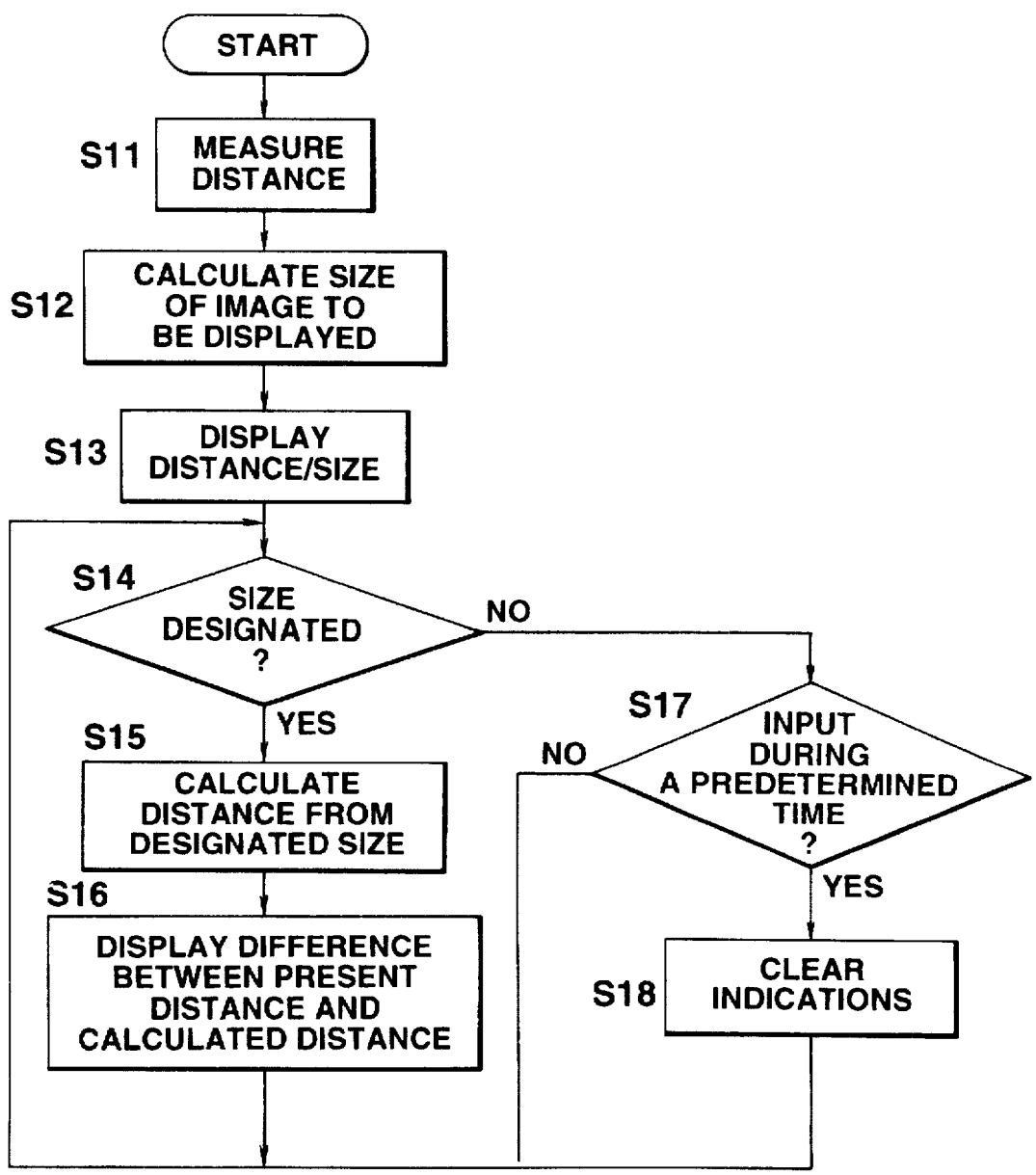
FIG. 18 is a flowchart of a displaying process for displaying guidance information on the external screen in the second embodiment of the projection type displaying apparatus.

FIG. 18 is a flowchart of a displaying process for displaying guidance information on the external screen 106.

In the automatic focussing mode, the focus adjustment of the projection lens 124 is made in association with the decided size of the projection image, but operation is not performed to move the external screen 106 or the projection type displaying apparatus 101 (precisely, the projection lens 124) to a right position.

In the present embodiment, the guidance information necessary for setting are displayed on the external screen 106, allowing easy setting.

When it is determined that the built-in screen 105 has been moved, for example, the infrared ray distance sensor (not shown) measures a distance between the projection lens 124 and the external screen 106 (step SS1). Then, an image size of the projection image is calculated referring to data given in Table 1 of FIG. 10 that corresponds to the measured distance (step SS2). A distance between the projection lens 124 and the external screen 106, and the image size of the projection image are displayed on the external screen 106 (step SS3).

It is determined whether the image size of the projection image is designated (step SS4). When the image size of the projection image is designated, a most suitable distance is calculated from the designated size and corresponding data given in the Table of FIG. 10 (step SS5). A difference between differences (1) and (2): the difference (1) between the calculated most suitable distance and the external screen 106; and the distance (2) between the projection lens 124 and the external screen 106; is displayed together with the designated image size of the projection image, as shown in FIG. 9.

In FIG. 9, an example is shown, in which the external screen 106 is fixed at a certain position and a distance (120 mm) is displayed, over which the projection type displaying apparatus 101, which is comparably easy to be moved, is moved to adjust the focus of an image projected on the external screen 106.

Meanwhile, when the image size of the projection image is not designated at step S14, it is determined whether an instruction is input during a predetermined time (step SS7). When no instruction is input, indications displayed on the external screen 106 are cleared (step SS8), and when an instruction is entered, the operation goes to a process of step S14 with the indications displayed on the external screen 106.

In this way, since various data necessary for setting the displaying apparatus 101, the external screen 106 and the projection lens 124 are displayed on the external screen 106, the user can set these elements easily.

In the present embodiment described above, with the focus adjustment function to be performed in the automatic focusing mode, the user is released from troublesome focus adjusting manipulation, and is allowed to make a fine focus adjustment according to his/her desire.

In the above embodiment, since a TFT color liquid crystal display panel is used as the liquid crystal light bulb and the TFT color liquid crystal display panel comprises the liquid crystal display panel 45 with the polarizing plates provided on both sides thereof, the polarizing plates produce loss in light energy.

More specifically, 60% of natural light emitted from the light source is absorbed by the polarizing plate at an incident side in the course of allowing polarized light to pass through therefrom. The absorbed light is changed to heat, raising temperature of the polarizing plate. 40% of the light, i.e., light passing through the polarizing plate is guided to the liquid crystal display panel to illuminate the same. The light passing through the liquid crystal display panel reaches another polarizing plate at an output side and further 60% of the passing light is absorbed therein. Therefore, approximately 20% of the original natural light is used.

If not only light component polarized in one direction is allowed to pass through the polarizing plates, but all natural light emitted from the light source is converted to light polarized in one direction by the polarizing plates, not only available light volume will be increased, but deterioration of the polarizing plates due to heat will be avoided.

To use light from the light source more efficiently, it will be useful to use a liquid crystal light bulb using liquid crystals of a high molecular dispersion type in place of the STN color LCD panel and the color TFT active matrix LCD panel.

Contrary to the TN mode Liquid Crystal Display panel (LCD) provided with polarizing plates, dispersion and absorption of rays of incident light produces contrast of display on the liquid crystal light bulb using the high molecular dispersion liquid crystals. With no electric field applied to the liquid crystal light bulb, rays of incident light are scattered or dispersed in the liquid crystal light bulb using the liquid crystals of a high molecular dispersion type. With electric field applied to the liquid crystal light bulb, encapsulated nematic liquid crystals are aligned in a direction of the electric field and the liquid crystals of a high molecular dispersion type are brought to a transmitting state.

The high molecular dispersion liquid crystals, which do not use the polarizing plates, realize brightness three times of that of TN mode liquid crystals. Further, when used as a guest host display, the high molecular dispersion liquid crystals realizes a wide view angle and shows a higher response speed (2–5 ms) than TN mode liquid crystals, and, therefore, allows more efficient use of transmitting light in comparison with that in the described embodiment.

Though having been described specifically with reference to the preferred embodiment, the present invention is not limited to the above first embodiment and may be modified in various manners. All the modifications and applications of the present invention will be within the scope and spirit of the present invention, so that the scope of the present invention should be determined only by what is recited in the present appended claims and their equivalents.

For example, in the above described embodiment of the invention, in consideration of increase in power consumption, rise in temperature of the apparatus body and deterioration of parts used in the apparatus, the metal halide lamp is employed as the light source, but a halogen lamp and a xenon lamp may be used so as to meet the above conditions.

Further, in consideration of weight of the apparatus and optical characteristics, a plastic optical lens is used in the above embodiment, but number of optical lenses and material of the lenses may be arbitrarily selected in consideration of required characteristics thereof.

In the above embodiment, a transmitting type screen of 40-inch diagonal and a transmitting type screen of 60-inch diagonal are used as the external screens 106a and 106b, but any size of screen may be used for the external screen. Further, a reflection type screen with a right/left reversing function may be used in place of the transmitting type screen.

In the above embodiment, a color LCD panel is used as the liquid crystal display panel for a color display, but three liquid crystal panels for three colors R (red), G (green) and B (blue) may be used or a single liquid crystal display panel with R, G and B pixels disposed thereon may be used for displaying a color image.

What is claimed is:

1. A projection type displaying apparatus comprising:
   image displaying means for displaying an image;
   image projecting means for projecting the image displayed by said image displaying means;
   a movable screen onto which the image is projected by said image projecting means;
   detecting means for detecting a position of said movable screen;
   memory means for storing latest states of said image projecting means when said movable screen is located out of a projection optical path of said image projecting means, said latest states corresponding to a condition wherein said movable screen is located out of a projection optical path of said image projecting means; and
   control means for controlling said image projecting means based on said latest states of said image projecting means stored in the memory means in response to the position of the movable screen detected by said detecting means.

2. A projection type displaying apparatus as claimed in claim 1, further comprising:
   a remote controller for producing a remote control signal; and
   a signal receiving unit for receiving said remote control signal,
   wherein when said remote control signal is received by said signal receiving unit, said control means controls said image projecting means to perform a focusing operation.

3. A projection type displaying apparatus as claimed in claim 2, wherein said control means includes means for storing a focusing pattern capable of readily focusing the image, and means for causing said image displaying means to display said focusing pattern when the focusing operation is carried out by said projecting means in response to said remote control signal being received by said receiving unit.

4. A projection type displaying apparatus as claimed in claim 2, wherein said control means includes means for causing said image displaying means to display an indicator indicating a screen size established when the projected image is in an in-focus condition while the focusing operation is carried out by said projecting means in response to said remote control signal being received by said receiving unit.

5. The projection type displaying apparatus as claimed in claim 2, wherein said memory means includes means for storing a state of said image projecting means corresponding to a condition wherein said screen is located in the projection optical path of said image projecting means.

6. A projection type displaying apparatus comprising:
   image displaying means for displaying an image;
   image projecting means for projecting the image displayed by said image displaying means;
   a screen on which the image is projected by said image projecting means;
   detecting means for detecting a position of said screen;
   memory means for storing a state of said image projecting means corresponding to said position of said screen detected by said detecting means; and
   control means for controlling said image projecting means to project the image based upon said state of said image projecting means stored in said memory means, and for causing said image displaying means to display a projection size of the projected image when the projected image is focused.

7. A projection type displaying apparatus as claimed in claim 6, further comprising:
   moving means for moving said screen onto which the image is projected by said image projecting means; and
   measuring means for measuring a distance between said image projecting means and said screen, and
   wherein said control means includes means for producing an advice for an operator based on the distance measured by said measuring means, whereby the operator may set a condition of at least one of said image displaying means, said image projecting means and said screen in response to said advice.

* * * * *